Dec. 5, 1950           A. GOTTFRIED          2,532,713
RESILIENT SEAT SUPPORT
Filed June 28, 1946                      2 Sheets-Sheet 1
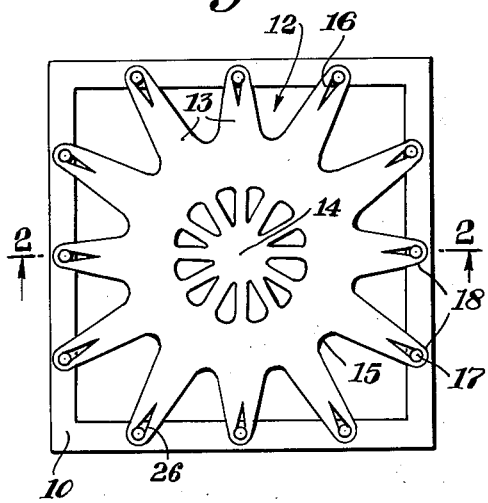
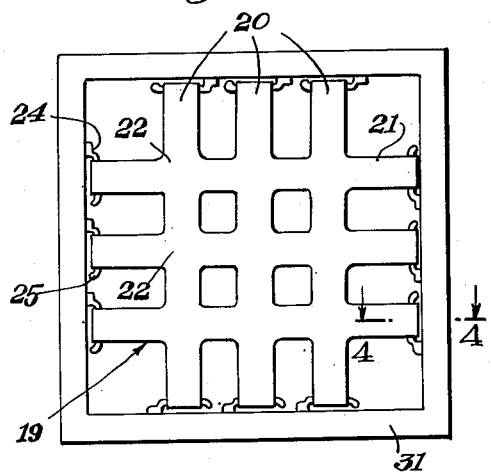
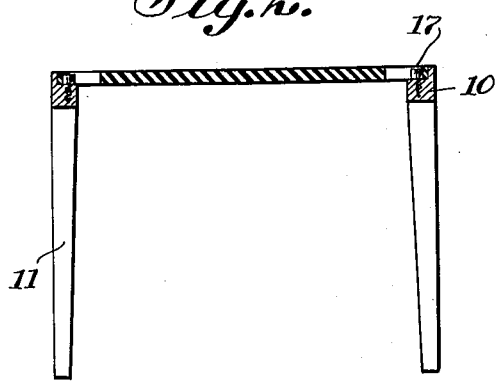
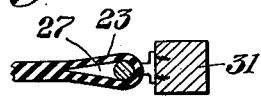
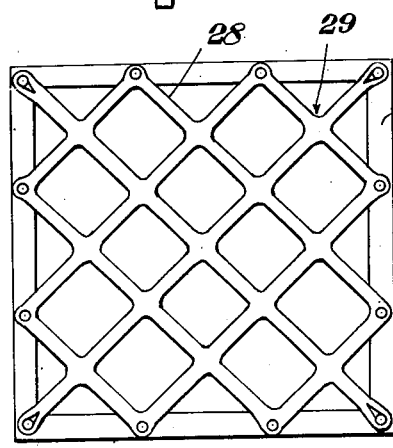
INVENTOR.
BY Alois Gottfried Dec. 5, 1950  A. GOTTFRIED  2,532,713
RESILIENT SEAT SUPPORT
Filed June 28, 1946  2 Sheets-Sheet 2
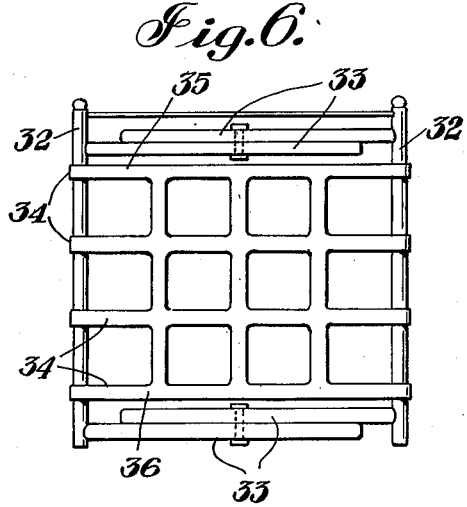
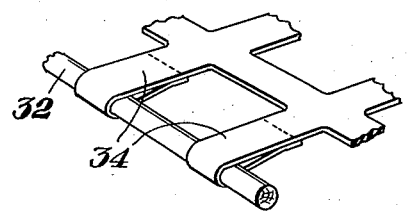
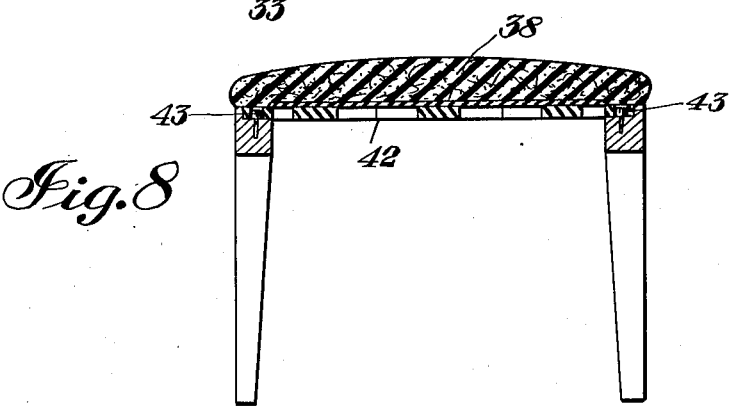
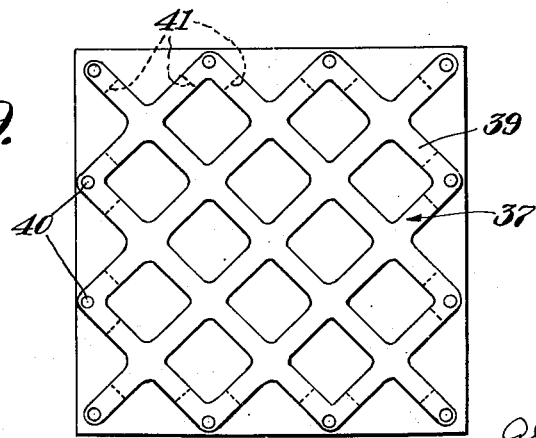
INVENTOR.
Alois Gottfried
BY Patented Dec. 5, 1950

2,532,713

UNITED STATES PATENT OFFICE 2,532,713

RESILIENT SEAT SUPPORT

Alois Gottfried, Los Angeles, Calif.

Application June 28, 1946, Serial No. 682,116

1 Claim. (Cl. 155—179)

My present invention relates to seats and more particularly to resilient seat supports.

It is an object of my present invention to provide a resilient seat support which is extremely simple to manufacture and easy to secure to the frame of a chair.

It is another object of my present invention to provide a resilient supporting structure for seats which consists of one piece and has not to be assembled from a number of different elements.

It is a further object of my present invention to provide a seat support which is inexpensive and can be easily replaced by anybody without any skill in this field.

With the above objects in view, my new seat support comprises a flat unitary rubber network structure provided along its edges with means for attaching this flat unitary rubber network structure to the frame of a seat.

More particularly, my new resilient seat support comprises a network structure consisting of intersecting rubber strips integrally connected to each other at all their points of intersection; the attaching means for attaching this rubber network structure to the frame of the seat are arranged at those ends of the rubber strips which are located along the edges of the rubber network.

The attaching means mentioned above preferably consist of attaching loop members forming part of the rubber strips themselves and molded, pressed, stamped cut out or otherwise produced out of one piece with the entire rubber network structure.

In accordance with a preferred embodiment of my present invention, the entire rubber network structure is made out of one flat sheet of rubber; if not made out of one sheet, the rubber network is arranged in one plane.

Actually, the entire structure consists of a flat unitary rubber network provided with a plurality of cut-outs so as to form between each two adjacent cut-outs a strip portion integrally connected at its ends to adjacent rubber strip portions; the attaching loop members described above form part of those rubber strip portions which are located along the edges of the rubber network structure described above.

As described below in detail, the cut-outs might be differently arranged so as to form differently shaped rubber networks: For instance, the cut-outs might be arranged so as to form a network consisting of a combination of radial and circular rubber strips or so as to form a combination of sets of parallel rubber strips arranged normal to each other. Of course, other network designs are possible.

I wish to stress, however, that all rubber networks adapted to serve as seat supports have to be constructed so that the rubber strips forming the same, are integrally connected at their intersection points, thereby evenly distributing the load.

I have found that supporting networks of the type proposed by me might very well be combined with resilient rubber cushions, particularly resilient foam sponge rubber cushions, so as to form one single unit with the same. Such rubber seats comprise in combination a resilient rubber network, attaching means, preferably attaching rubber loops, arranged along the edges of this rubber network forming part of the same, and a cushion consisting of a resilient material as rubber, e. g. foam sponge, firmly secured to one face of the above resilient supporting rubber network between the attaching rubber loops along the edges of the same.

I wish to stress that in some constructions I might use instead of a rubber network a flat rubber sheet support; however, the use of such sheet supports is limited to certain purposes.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a top view of a chair without a cushion provided with a resilient seat support according to my present invention;

Fig. 2 is an elevational section through the chair shown in Fig. 1 along line 2—2 of that figure;

Fig. 3 is a top view of a modified chair construction according to my present invention;

Fig. 4 is an elevational section through a detail of the chair shown in Fig. 3, along line 4—4 of that figure;

Fig. 5 is a schematic top view of a modified chair according to my present invention;

Fig. 6 is a top view of still another embodiment of a seat for a folding chair according to my present invention;

Fig. 7 is a perspective view of a part of the seat shown in Fig. 6;

Fig. 8 is an elevational section of a chair equipped with a combined cushion according to my present invention; and Fig. 9 is a bottom view of the cushion forming part of the chair shown in Fig. 8.

The chair shown in Figs. 1 and 2 consists of a chair frame 10 and chair legs 11 of conventional construction. According to my present invention, the seat support consists of a rubber network structure 12 composed of radially extending rubber strips 13 connected to each other at the center 14 of the structure 12, and one circular rubber strip 15 integrally connected to the radially extending rubber strips 13 and forming one unit with the same.

As shown in Figs. 1 and 2, rubber loop members 16 are provided at the outer ends of the radially extending rubber strips 13. These loop members engage hook members 17 arranged in cut-outs 18 provided in the chair form 10.

In order to assemble the chair, it is necessary to slip the loop members 16 over the hook members 17 and to place the cushion of the chair on this support. It is advisable to shape the rubber network so that the rubber strips forming the network are under a slight tension after the loop members 16 are slipped over the hook members 17.

The chair shown in Fig. 3 is similar in construction to the one shown in Figs. 1 and 2. The main difference is that the rubber network 19 consists of two sets 20 and 21 of parallel rubber strips arranged normal to each other and integrally connected at their intersection points 22. As shown in Fig. 4, loop members 23 are provided at the ends of the rubber strips 20 and 21. These loop members 23 engage horizontally arranged hook members 24. The free end of each of these hook members 24 is slightly bent inward at 25 so as to prevent unintentional slipping off of the loop member 23.

I wish to note that in the network structure 12 shown in Figs. 1 and 2, the loop openings 26 of the loops 16 are located in the plane of the network 12 and the hook members 17 are normal to this plane, while in the embodiment shown in Figs. 3 and 4 the loop openings 27 of the loops 23 are normal to the plane of the network 19 and the hook members 24 are located in this plane.

The seat support schematically shown in Fig. 5 is similar to the one shown in Fig. 3: The main difference is that the rubber strips 28 forming part of the rubber network 29 are arranged diagonally to the frame 30 forming part of the chair, while in the structure shown in Fig. 3 the rubber strips 20 and 21 forming network 19 are parallel to the edges of frame 31. As in all other seat supports described above, also in the embodiment shown in Fig. 5 all rubber strips form an integral structure and are firmly united at their points of intersection.

My new seat support might be used also directly as seat for folding chairs or the like. Thus, I have shown in Figs. 6 and 7 the seat of a folding chair which comprises as usual two bars 32 foldably connected by the legs 33 of the chair. The seat itself is formed by a rubber network of the type shown in Figs. 3 and 4, the only difference is that the attaching loops 34 are slipped directly over the bars 32 and do not engage separate hooks. A further difference is that no rubber loops are provided along the outer edges of the rubber strips 35 and 36 so that these strips are attached to the bars 32 only at their ends.

In Figs. 8 and 9 I have shown a chair equipped with a combined seat of the type proposed by me. This seat consists of a rubber network structure 37 of the type shown in Fig. 5 and of a foam sponge rubber cushion 38 firmly secured to the rubber strips 39 of the network structure 37.

I preferably use resilient connecting means, e. g. an adhesive rubber solution 42 for connecting the network structure 37 to the foam sponge cushion 38.

I wish to stress that the network structure 37 is secured to the bottom of the rubber cushion 38 only between the attaching loops 40, i. e. between the dotted lines 41 shown in Fig. 9 and indicating the limits of the adhesive coating 42 provided between network and cushion. Thus, it is possible to bend the loops 40 and slip them over the hook members 43 and to attach the combined seat structure to the frame of a chair.

It should be stressed that the term "rubber" as used above and in the following description and claims is intended to cover not only natural rubber, but also synthetic rubber and similar plastic materials which are resilient and might be used for structures of the type proposed by me.

I also wish to stress that although I have mentioned used of resilient network structures of the type described above only for seats, such structures might also be incorporated into the back of chairs and other seating equipment; furthermore, structures of the type proposed by me might also be used in beds, couches, and like furniture.

It will be understood that each of the elements described above, or two or more together, may also find a useful application in other types of furniture differing from the types described above.

While I have illustrated and described the invention as embodied in chairs, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

A resilient seat support comprising a flat unitary rubber network structure provided with a plurality of regularly arranged cut-outs arranged so as to form a plurality of radially arranged rubber strips integrally connected to each other at the center of said flat unitary rubber network structure and at least one substantially circular rubber strip arranged concentrically about said center of said flat unitary rubber network structure and integrally connected to said radially arranged rubber strips at their points of intersection, and attaching loop members arranged at the peripheral ends of said rubber strips forming part of the same.

ALOIS GOTTFRIED.

REFERENCES CITED

The following references are of record in the file of this patent:

UNITED STATES PATENTS

| Number | Name | Date |
|---|---|---|
| 10,313 | Merrell et al. | Dec. 13, 1853 |
| 879,335 | Southmayd | Feb. 18, 1908 |
| 1,488,804 | Brown | Apr. 1, 1924 |
| 1,843,893 | Becher | Feb. 2, 1932 |
| 2,159,520 | Chapman | May 23, 1939 |
| 2,163,359 | Van Derveer | June 20, 1939 |
| 2,421,851 | Rivard et al. | June 10, 1947 |

FOREIGN PATENTS

| Number | Country | Date |
|---|---|---|
| 105,007 | Australia | Aug. 31, 1938 |
| 671,327 | France | Sept. 2, 1929 |